United States Patent
Hines, III et al.

(10) Patent No.: US 7,535,994 B1
(45) Date of Patent: May 19, 2009

(54) PUBLIC SAFETY ACCESS POINT (PSAP) ADMINISTRATION SYSTEM AND METHOD FOR SAFELY MODIFYING DATA IN A PSAP DATABASE

(75) Inventors: Thomas Edward Hines, III, Belton, MO (US); Hilah A. Rozier, Lenexa, KS (US)

(73) Assignee: Sprint Communications Company LP, Overland Park, KS (US)

( * ) Notice: Subject to any disclaimer, the term of this patent is extended or adjusted under 35 U.S.C. 154(b) by 712 days.

(21) Appl. No.: 11/320,136

(22) Filed: Dec. 28, 2005

(51) Int. Cl.
*H04M 11/04* (2006.01)
(52) U.S. Cl. .............. 379/45; 707/1; 707/10; 707/100; 707/104.1; 707/200
(58) Field of Classification Search ............. 379/37–51, 379/112.01; 455/12.1, 404.2; 709/223; 707/1–10, 707/100–104.1, 200
See application file for complete search history.

(56) References Cited

U.S. PATENT DOCUMENTS

| | | | | |
|---|---|---|---|---|
| 5,323,444 A | * | 6/1994 | Ertz et al. ..................... 379/45 |
| 6,128,656 A | * | 10/2000 | Matchefts et al. ........... 709/223 |
| 6,249,571 B1 | * | 6/2001 | Rojas ..................... 379/112.01 |
| 6,597,892 B1 | * | 7/2003 | Caldwell et al. ........... 455/12.1 |
| 2006/0270384 A1 | * | 11/2006 | Sahim et al. ............. 455/404.2 |

* cited by examiner

*Primary Examiner*—Curtis Kuntz
*Assistant Examiner*—Maria El-Zoobi

(57) ABSTRACT

A Public Safety Access Point (PSAP) administration system is provided for safely modifying data in a PSAP database. The system includes a GUI, a storage system, and a processing system. The processing system logs changes to a data portion and defines modified data fields and unmodified data fields. The processing system reads out and stores a safe copy of the data portion from the PSAP database. The processing system writes the data portion to the PSAP database after reading the safe copy. The processing system reads out a verification copy of the data portion written to the PSAP database and compares the unmodified data fields of the safe copy to the unmodified data fields of the verification copy. The processing system generates an alarm if the unmodified data fields of the safe copy are not identical to the unmodified data fields of the verification copy.

19 Claims, 5 Drawing Sheets

PUBLIC SAFETY ACCESS POINT (PSAP) ADMINISTRATION SYSTEM AND METHOD FOR SAFELY MODIFYING DATA IN A PSAP DATABASE

BACKGROUND OF THE INVENTION

1. Field of the Invention

The invention is related to the field of Public Safety Access/Answering Point (PSAP) data, and in particular, to a system and method for safely modifying data in a PSAP database.

2. Statement of the Problem

The 911 emergency telephone system has long been a valuable and useful system for handling emergency telephone calls. In a 911 system, a person in an emergency situation dials a 911 telephone number and is connected to an emergency dispatcher. The caller's telephone number can be automatically referenced in order to determine the caller's location. Using the Automatic Number Identification (ANI) system (and using the Automatic Location Identification (ALI) system), the emergency dispatcher can receive the caller's location. This greatly aids in alerting and dispatching appropriate emergency responders, such as police, ambulance, and/or fire personnel.

With the advent of cellular telephones, the emergency response scenario became more difficult. A cellular telephone, by its nature, is a roaming device and cannot be characterized by a fixed geographical position. A cellular phone can be easily located to be within a base station area, using registration data from the cellular phone, but in the past the actual location of the cellular phone user was often impossible to pinpoint. However, improvements in location technology have improved the ability to locate a cellular telephone. The Global Positioning System (GPS) technology offers position location circuitry that can be imbedded in a cellular telephone. In addition, a Mobile Positioning System (MPS) or some manner of triangulation system can be used in order to determine the position of a cellular telephone. This information can be used for emergency purposes.

One component of an emergency system, such as the 911 system, is a PSAP database. When a 911 call is placed, telecommunications service providers route the call to the appropriate PSAP so that emergency personnel can be dispatched. A PSAP database stores information about both landline and wireless telephones for use by emergency dispatchers and emergency responders. A PSAP database includes geographic emergency responder information by region. A PSAP database includes jurisdictional boundaries and includes telephone numbers, names, etc., for each such emergency responder region. Therefore, a PSAP database is a valuable storage of information for emergency personnel.

A common construct for operating and/or interacting with a PSAP system is a Graphical User Interface (GUI). A GUI comprises a graphical representation of data and can further comprise graphical interfaces that allow user control over the data. A human user of the PSAP system can manipulate the GUI, such as by the manipulation of icons, buttons, sliders, selectors, etc., in order to call up PSAP data and modify the PSAP data.

SUMMARY OF THE SOLUTION

A Public Safety Access Point (PSAP) administration system for safely modifying data in a PSAP database is provided according to the invention. The PSAP administration system comprises a Graphical User Interface (GUI) for enabling user interaction, a storage system, and a processing system in communication with the GUI and the storage system. The processing system is configured to log changes to a data portion to be modified. The logging defines one or more modified data fields and one or more unmodified data fields in the data portion. The processing system is further configured to read out and store a safe copy of the data portion from the PSAP database. The processing system is further configured to write the data portion to the PSAP database after reading the safe copy from the PSAP database. The processing system is further configured to read out a verification copy of the data portion written to the PSAP database and compare the one or more unmodified data fields of the safe copy to the one or more unmodified data fields of the verification copy. The processing system is further configured to generate an alarm if the one or more unmodified data fields of the safe copy are not identical to the one or more unmodified data fields of the verification copy.

A method for safely modifying data in a PSAP database is provided according to the invention. The method comprises logging changes to a data portion to be modified. The logging defines one or more modified data fields and one or more unmodified data fields in the data portion. The method further comprises reading out and storing a safe copy of the data portion from the PSAP database and writing the data portion to the PSAP database after reading the safe copy from the PSAP database. The method further comprises reading out a verification copy of the data portion written to the PSAP database and comparing the one or more unmodified data fields of the safe copy to the one or more unmodified data fields of the verification copy. The method further comprises generating an alarm if the one or more unmodified data fields of the safe copy are not identical to the one or more unmodified data fields of the verification copy.

A method for safely modifying data in a PSAP database is provided according to the invention. The method comprises logging changes to a data portion to be modified. The logging defines one or more modified data fields and one or more unmodified data fields in the data portion. The method further comprises reading out and storing a safe copy of the data portion from the PSAP database and writing the data portion to the PSAP database after reading the safe copy from the PSAP database. The method further comprises reading out a verification copy of the data portion written to the PSAP database and comparing the one or more unmodified data fields of the safe copy to the one or more unmodified data fields of the verification copy. The method further comprises restoring the one or more unmodified data fields of the safe copy to the PSAP database if the one or more unmodified data fields of the safe copy are not identical to the one or more unmodified data fields of the verification copy.

DESCRIPTION OF THE DRAWINGS

The same reference number represents the same element on all drawings.

DETAILED DESCRIPTION OF THE INVENTION

FIGS. 1-5 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
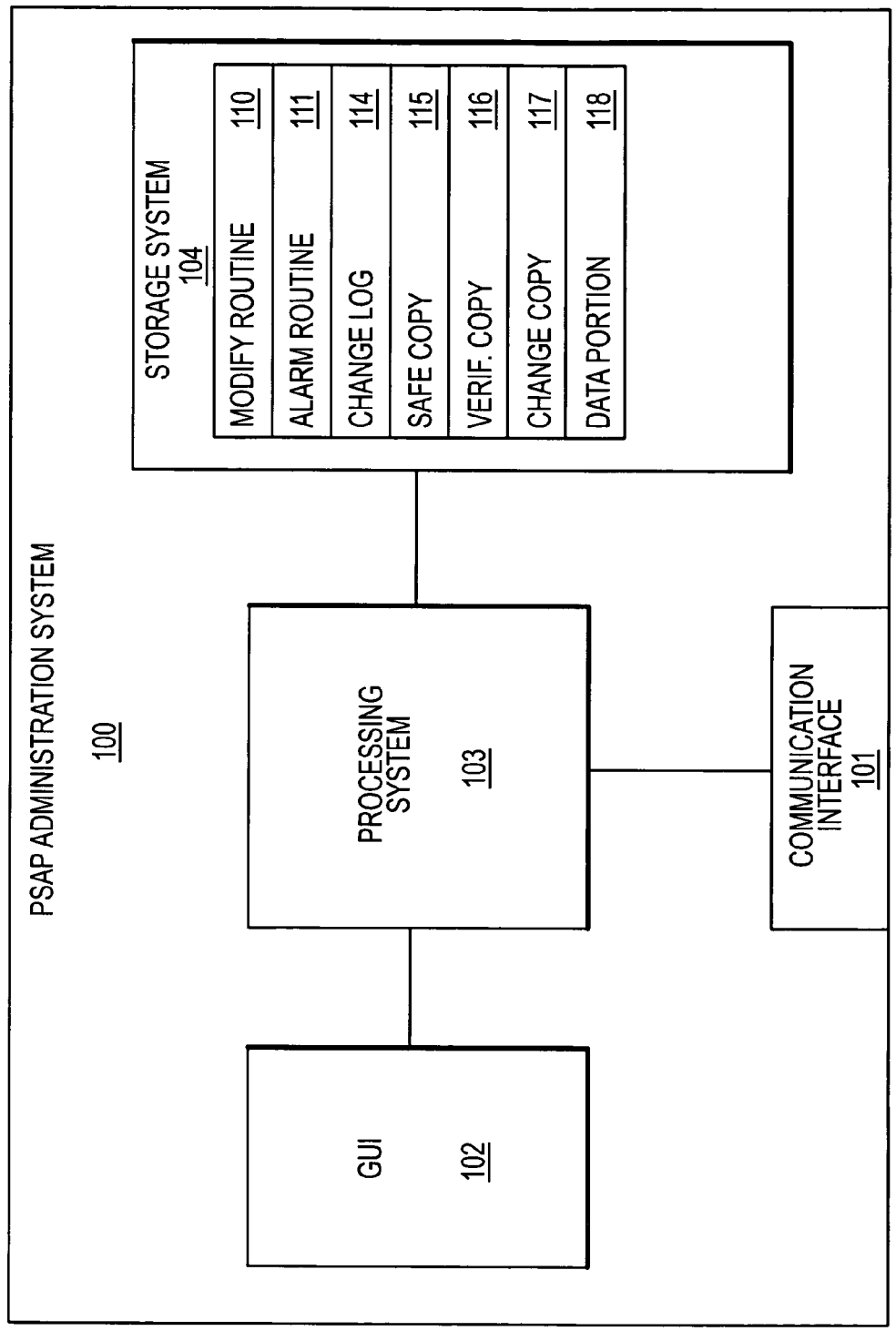
FIG. 1 shows a Public Safety Access/Answering Point (PSAP) administration system according to an embodiment of the invention.

FIG. 1 shows a Public Safety Access/Answering Point (PSAP) administration system 100 according to an embodiment of the invention. The PSAP administration system 100 in one embodiment includes a communication interface 101, a Graphical User Interface (GUI) 102, a processing system 103, and a storage system 104. The processing system 103 is in communication with the communication interface 101, the GUI 102, and the storage system 104.

The PSAP administration system 100 is employed to administrate PSAP data, such as data concerning telephone numbers and locations of emergency responders, including telephone numbers for sheriff's department of various localities, etc. The PSAP data can be stored on designated computer systems, such as on regional databases, for example. In one embodiment, the PSAP administration system 100 comprises all or part of a Mobile Application Provisioning System (MAPS).

In operation, the PSAP administration system 100 retrieves PSAP data from a PSAP database and can be used to view and modify the PSAP data. The modified PSAP data is then written back to the PSAP database by the PSAP administration system 100.

However, due to the important nature of the data and due to the consequences of improper saving of modified data, it is very important that the modified PSAP data be properly and correctly written back to the PSAP database. It is especially important that the data fields that have not been changed do not become changed or corrupted during any modification/updating process. Therefore, the PSAP administration system 100 according to the invention retrieves and stores a "safe" copy of the unchanged data. The safe copy can comprise a copy of PSAP data retrieved before any changes are written back to the PSAP database. A safe copy can be obtained by the PSAP administration system 100 before a user or operator makes any changes, such as when the PSAP administration system 100 obtains data for display on the GUI 102. Alternatively, the safe copy can be obtained immediately before a write operation, where modified data is to be written back to the PSAP database. After the write operation, this safe copy is compared to the PSAP database in order to confirm that the write operation has not overwritten or corrupted data that was not intended to be changed. As a result, if the write operation results in corruption or overwriting, the error can be determined. An alarm can be set to inform the operator of the PSAP administration system 100. In addition, the original unmodified data fields can be restored to the PSAP database.

The communication interface 101 conducts communications between the PSAP administration system 100 and other electronic devices. The communication interface 101 can be used where the PSAP database comprises a remote system. Alternatively, the PSAP administration system 100 can be sited at or with the PSAP database and the processing system 103 can communicate with the PSAP database without the need for the interface 101.

The GUI 102 comprises a user interface that graphically displays the PSAP data. A user can employ the GUI 102 to call up and modify the PSAP data. For example, the GUI 102 can display geographical boundaries of a PSAP region in a geographical manner. The user in some embodiments can click on a boundary and drag and move the boundary to a new location. The boundary can be moved as needed, and the user can select a write option when the user is satisfied with the boundary modification. The new boundary location can then be written to the PSAP database.

The storage system 104 stores routines for execution by the processing system 103. For example, the storage system 104 can store a modify routine 110 and an alarm routine 111. The modify routine 110 controls a PSAP data modify operation, including retrieving a safe copy and performing a comparison to the safe data (see FIGS. 2-5 and the accompanying discussion below).

The processing system 103 executes the alarm routine 111. The alarm routine 111 performs some manner of alarm process if an error is determined to exist in the unmodified data fields after a write operation. For example, the alarm routine 111 can generate some manner of audio, visual, and/or textual alarm message on the GUI 102. In addition, the alarm routine 111 can perform alarm operations. One such alarm operation can include restoring corrupted or changed instances of unmodified data fields. Another alarm operation can include displaying intended and actual write values in order to show to the user the error or errors that have occurred.

The storage system 104 can store data obtained from a PSAP database. The data can be held in the storage system 104 and can be operated on and/or modified by the processing system 103. The storage system 104 can store a change log 114, a safe copy 115, a verification copy 116, a change copy 117, and a data portion 118.

The data portion 118 comprises one or more data fields retrieved from the PSAP database. The data portion 118 can comprise data retrieved for the purpose of generating a display on the GUI 102. The data portion 118 can comprise data retrieved from the PSAP database in order to change or modify the contents of the PSAP database. The data contained in the data portion 118 can be continuously changing as the user of the PSAP administration system 100 views different PSAP data and as the user modifies the PSAP data. When the user decides to write changes back to the PSAP database, then the contents of the data portion 118 can be sent to the PSAP database using the communication interface 101.

The change log 114 can be used to record changes to the data portion 118. The change log 114 delineates modified and unmodified data fields of the data portion 118. The data fields in the safe copy 115 and the verification copy 116 match up to the data fields of the data portion 118. The change log 114 can therefore be used to perform a comparison of unmodified data fields in the safe copy 115 to the unmodified data fields of the verification copy 116. Further, the change log 114 can be used to compare modified data fields in the change copy 117 and in the verification copy 116.

The safe copy 115 comprises a copy of the original data before any modifications to the data portion 118. The safe copy 115 is read from the PSAP database at any point in time before the write operation to the PSAP database. The safe copy 115 therefore comprises a copy of the original, unmodified data fields before the write.

The verification copy 116 comprises a copy of the data that has been written to the PSAP database. After the data portion 118 has been written to the PSAP database, the written data is read back out into the verification copy 116. The verification copy 116 is used to verify that the write operation did not incorrectly write data to an improper data field in the PSAP database.

The change copy 117 comprises a copy of the data portion 118 that is made before the write operation to the PSAP database. The change copy 117 is made in order to ensure that the modified data fields of the data portion 117 are successfully written to the PSAP database. The change copy 117 is later compared to the verification copy 116 in order to verify that the modified data fields were actually written to the PSAP database. If the modified data field of the change copy 117 is not identical to the corresponding modified data field of the verification copy 116, then an alarm condition is generated. If they are not identical, then data fields that should have been changed have not been actually changed in the write operation (i.e., the modified data fields have not changed in the PSAP database).

Figure 2:
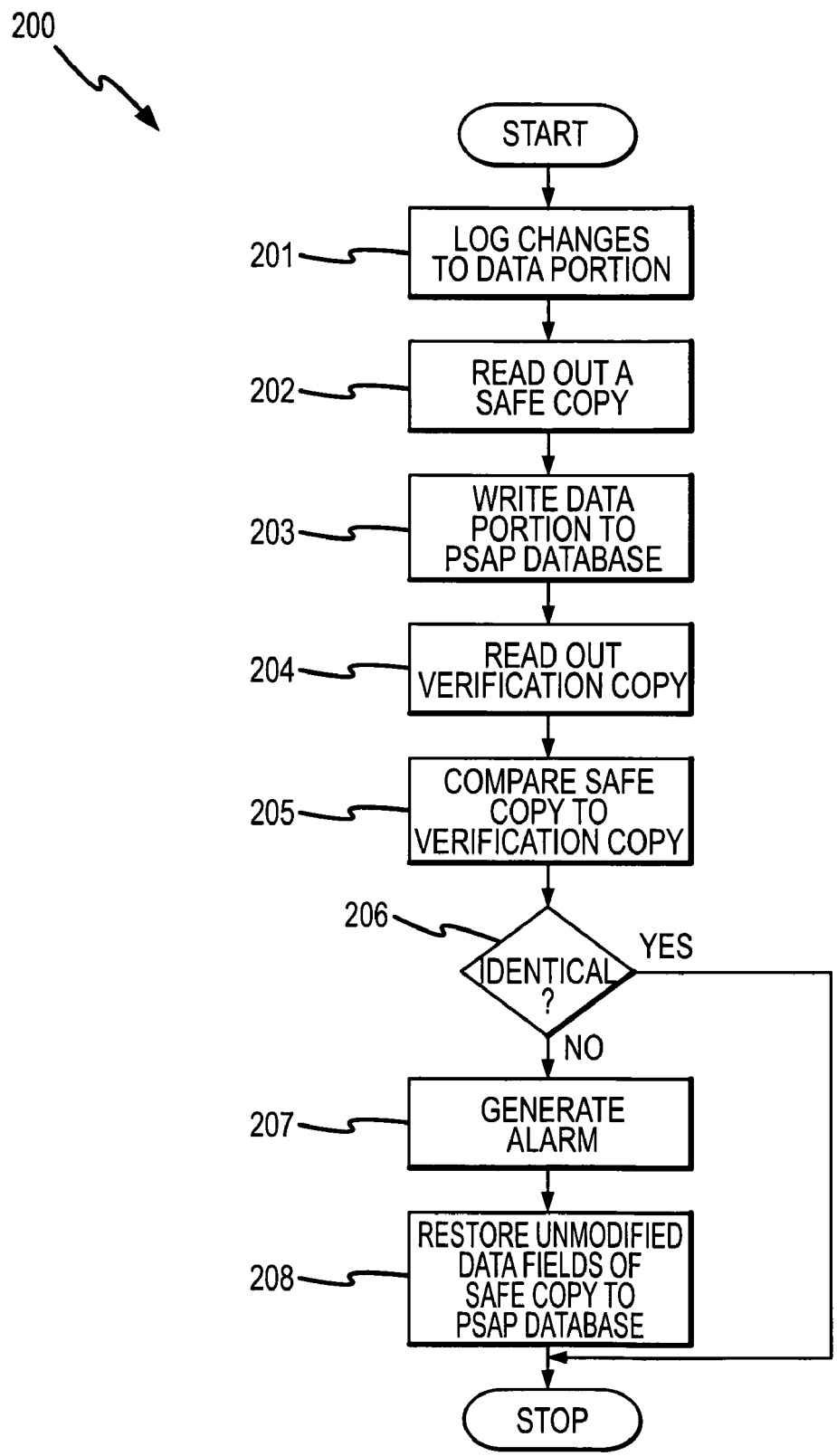
FIG. 2 is a flowchart of a method for safely modifying data in a PSAP database according to an embodiment of the invention.

FIG. 2 is a flowchart 200 of a method for safely modifying data in a PSAP database according to an embodiment of the invention. In step 201, all changes to a data portion 118 are recorded in a change log 114. The change log 114 defines unmodified data fields and modified data fields of the data portion 118.

In step 202, a safe copy 115 is read from the PSAP database. The read in one embodiment can be in response to an initiation of a write and before the write. In one embodiment, the safe copy 115 is stored in the storage system 104 of a PSAP administration system 100. The safe copy 115 is held until at least a comparison operation is performed.

In step 203, the data portion 118 is written to the PSAP database. The write in one embodiment can be performed after reading the safe copy 115 from the PSAP database. The data portion 118 can comprise part or all of a data record or data structure obtained from the PSAP database. The data portion 118 can include modified and unmodified data fields.

In step 204, a verification copy 116 is read from the PSAP database. The verification copy 116 comprises a copy of the data portion 118 that was written to the PSAP database in step 203. Ideally, if the write operation took place properly and without error, then the verification copy 116 will be identical to the safe copy 115 in regard to the unmodified data fields. However, the modified data fields will not be identical.

In step 205, the safe copy 115 is compared to the verification copy 116. The comparison is performed in order to determine whether the write operation was correctly performed.

In step 206, if the unmodified data fields of the safe copy 115 are identical to the unmodified data fields of the verification copy 116, then the method exits. Otherwise, if the unmodified data fields of the safe copy 115 are not identical to the unmodified data fields of the verification copy 116, then the method proceeds to step 207.

In step 207, because the comparison was not identical, an alarm is generated. As previously discussed, the alarm can comprise any manner of visual and/or audio alarm display generated to the user or operator. The alarm can include displaying the unmodified data fields of the safe copy 115 and displaying the unmodified data fields of the verification copy 116. In one embodiment, the processing system 103 generates the display of the unmodified data fields and transfers the display to the GUI 102.

In step 208, because the comparison was not identical, the unmodified data fields can be restored to the PSAP database in one embodiment. In one embodiment, the unmodified data fields of the safe copy 115 are written back to the PSAP database in order to restore the unmodified data fields.

Figure 3:
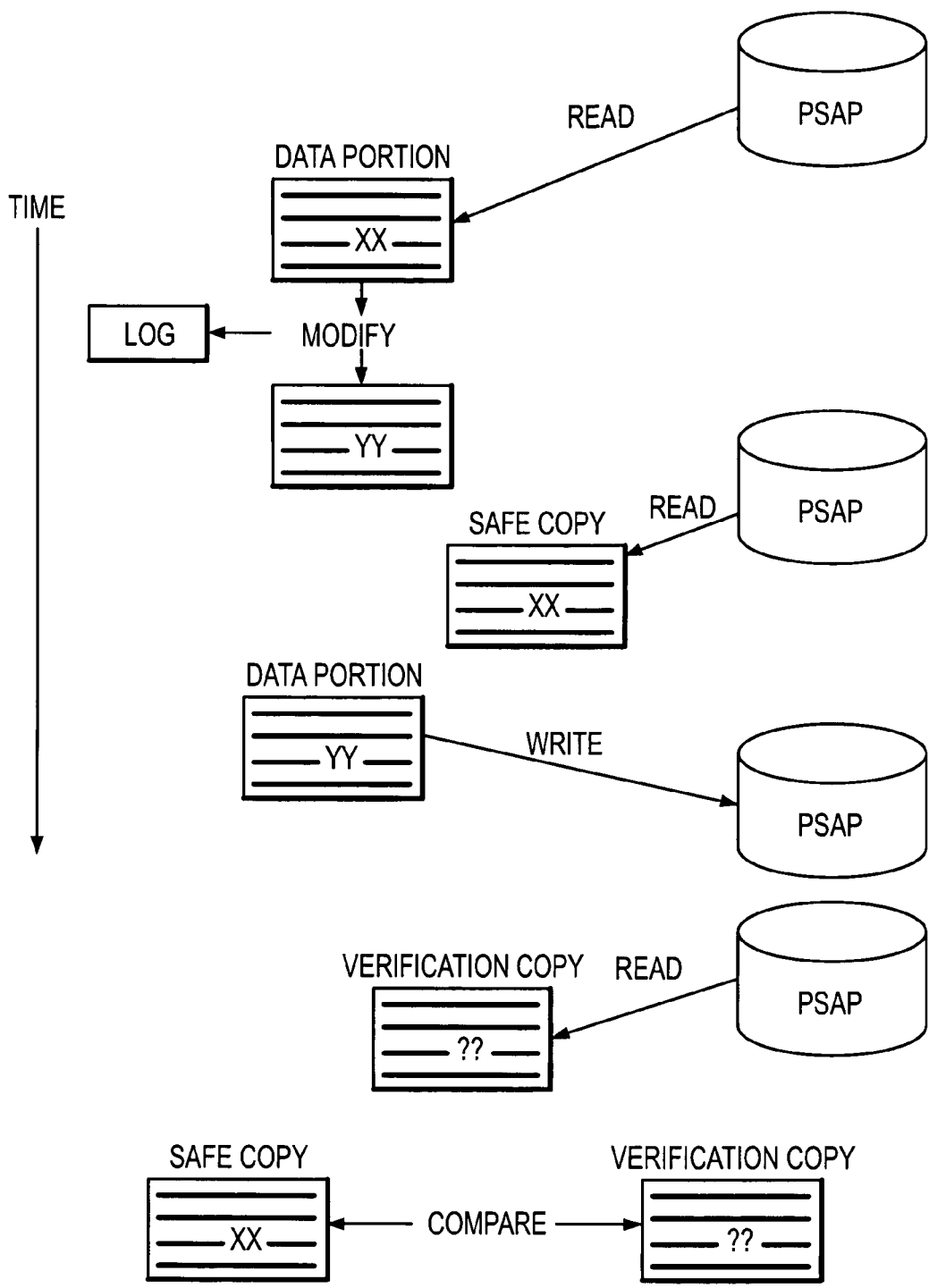
FIG. 3 is a timing diagram that shows data read, write, modify, and compare operations that are performed according to an embodiment of the invention.

FIG. 3 is a timing diagram that shows data read, write, modify, and compare operations that are performed according to an embodiment of the invention. The first action is the read of the data portion 118 from the PSAP database. The data portion 118 may be obtained in order to display PSAP data on the GUI 102. In addition, the data portion 118 may be obtained in order to modify one or more data fields.

In the second action, the original data field XX is modified to now be YY. The data portion 118 is now different from the original data stored in the PSAP database and includes a modified data field. The change to the data field is recorded in the change log 114.

The third action is the read of the safe copy 115 from the PSAP database. The safe copy 115 includes the original, unmodified data field XX. Although this is shown as occurring after the modify action, the read of the safe copy 115 can occur at any point before the write action. In one embodiment, the read of the safe copy 115 is prompted by a user-initiated write action.

The write action writes the modified data portion 118 to the PSAP database. The write action writes the modified data field or fields (i.e., the YY data) as well as all of the unmodified data fields (represented by the lines in the data portion). It should be understood that the unmodified data fields should remain unchanged in the PSAP database.

The next action is the read of the verification copy 116 from the PSAP database. The verification copy 116 contains the same data that was written to the PSAP database, barring any errors, overwrites, etc., in the write operation. As a consequence, the verification copy 116 should contain exactly the same data as the data that was saved in the safe copy 115, except for the modified data fields.

The comparison action compares one or more unmodified data fields of the safe copy 115 to one or more unmodified data fields of the verification copy 116. The unmodified data fields of the safe copy 115 and the verification copy 116 should be identical. If the comparison is not identical, then the PSAP administration system 100 can determine that an error occurred in the writing of the data portion to the PSAP database and can take appropriate action.

The comparison does not compare modified data fields. The comparison therefore does not verify that modified data fields were properly written to the PSAP database. The comparison only determines whether the unmodified data fields were properly written to the PSAP database.

Figure 4:
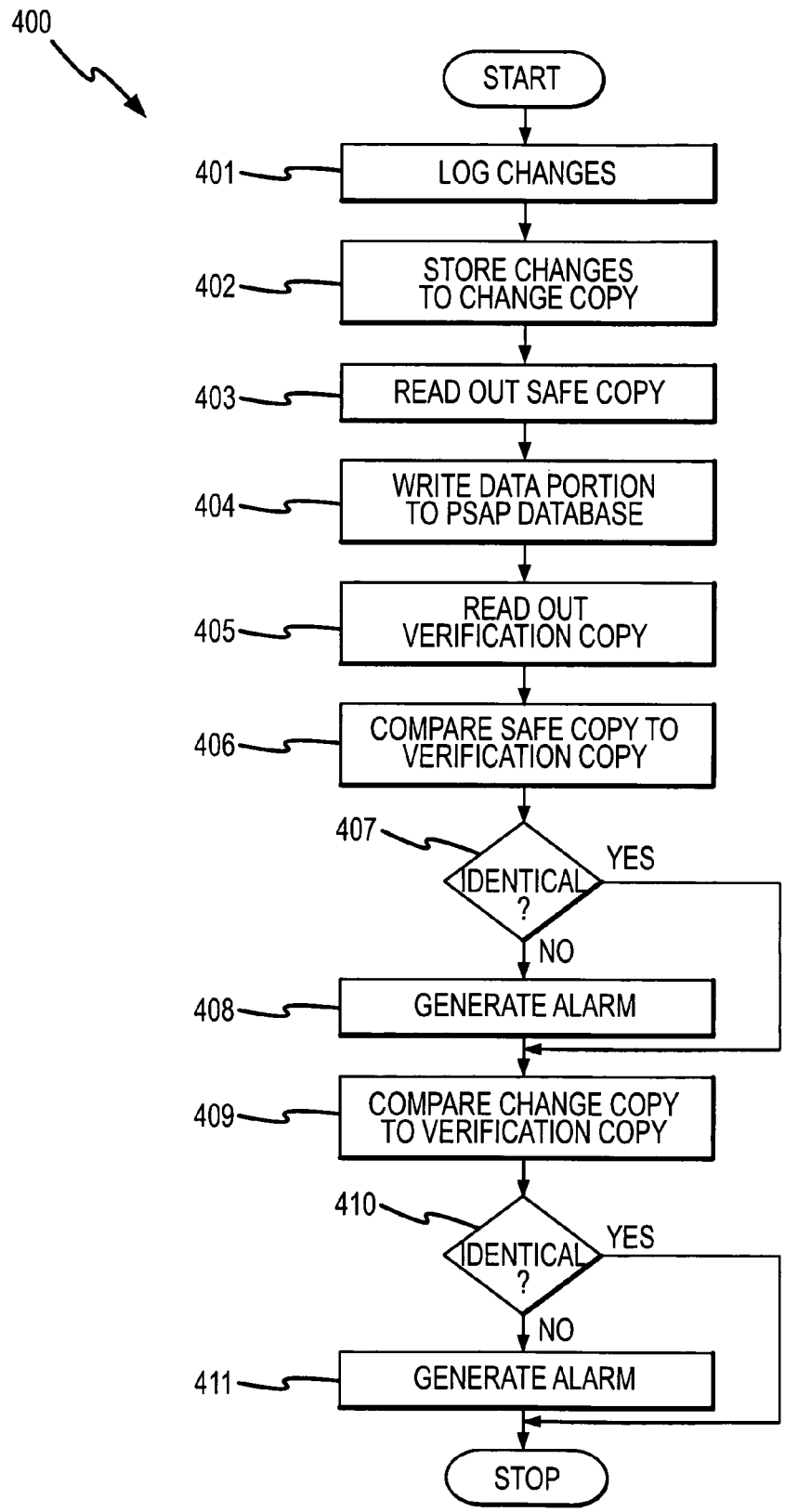
FIG. 4 is a flowchart of a method for safely modifying data in a PSAP database according to an embodiment of the invention.

FIG. 4 is a flowchart 400 of a method for safely modifying data in a PSAP database according to an embodiment of the invention. In step 401, all changes to a data portion 118 are logged, as previously discussed.

In step 402, the changes to the data portion 118 are also stored in a change copy 117. The change copy 117 therefore includes the changes to the data portion 118 (i.e., the modified data fields).

In step 403, a safe copy 115 is read out of the PSAP database, as previously discussed.

In step 404, the data portion 118 is written to the PSAP database, as previously discussed. The data portion 118 includes modified and unmodified data fields.

In step 405, a verification copy 116 is read out of the PSAP database, as previously discussed.

In step 406, the safe copy 115 is compared to the verification copy 116, as previously discussed. Specifically, the unmodified data fields of the safe copy 115 are compared to the unmodified data fields of the verification copy 116. The comparison is performed in order to determine whether the write operation was correctly performed with regard to the unmodified data fields.

In step 407, if the unmodified data fields of the safe copy 115 are identical to the unmodified data fields of the verification copy 116, then the method branches to step 409. Otherwise, if the unmodified data fields of the safe copy 115 are not identical to the unmodified data fields of the verification copy 116, then the method proceeds to step 408.

In step 408, because the comparison of the unmodified data fields was not identical, an alarm is generated, as previously discussed. In addition, the alarm can include data restoration, also previously discussed.

In step 409, the change copy 117 is compared to the verification copy 116. This comparison is done in order to determine whether the data fields that were intended to be modified in the write operation were in fact modified. Specifically, the modified data fields of the change copy 117 are compared to the modified data fields of the verification copy 116.

In step 410, if the modified data fields of the change copy 117 are identical to the modified data fields of the verification copy 116, then the method exits. Otherwise, if the modified data fields of the change copy 117 are not identical to the modified data fields of the verification copy 116, then the method proceeds to step 411.

In step 411, an alarm is generated. The alarm can include any manner of visual, graphical, and/or audio alarm to the user. The alarm indicates that the modified data fields were not successfully written to the PSAP database. The alarm can include displaying the modified data fields of the change copy 117 and displaying the modified data fields of the verification copy 116.

Figure 5:
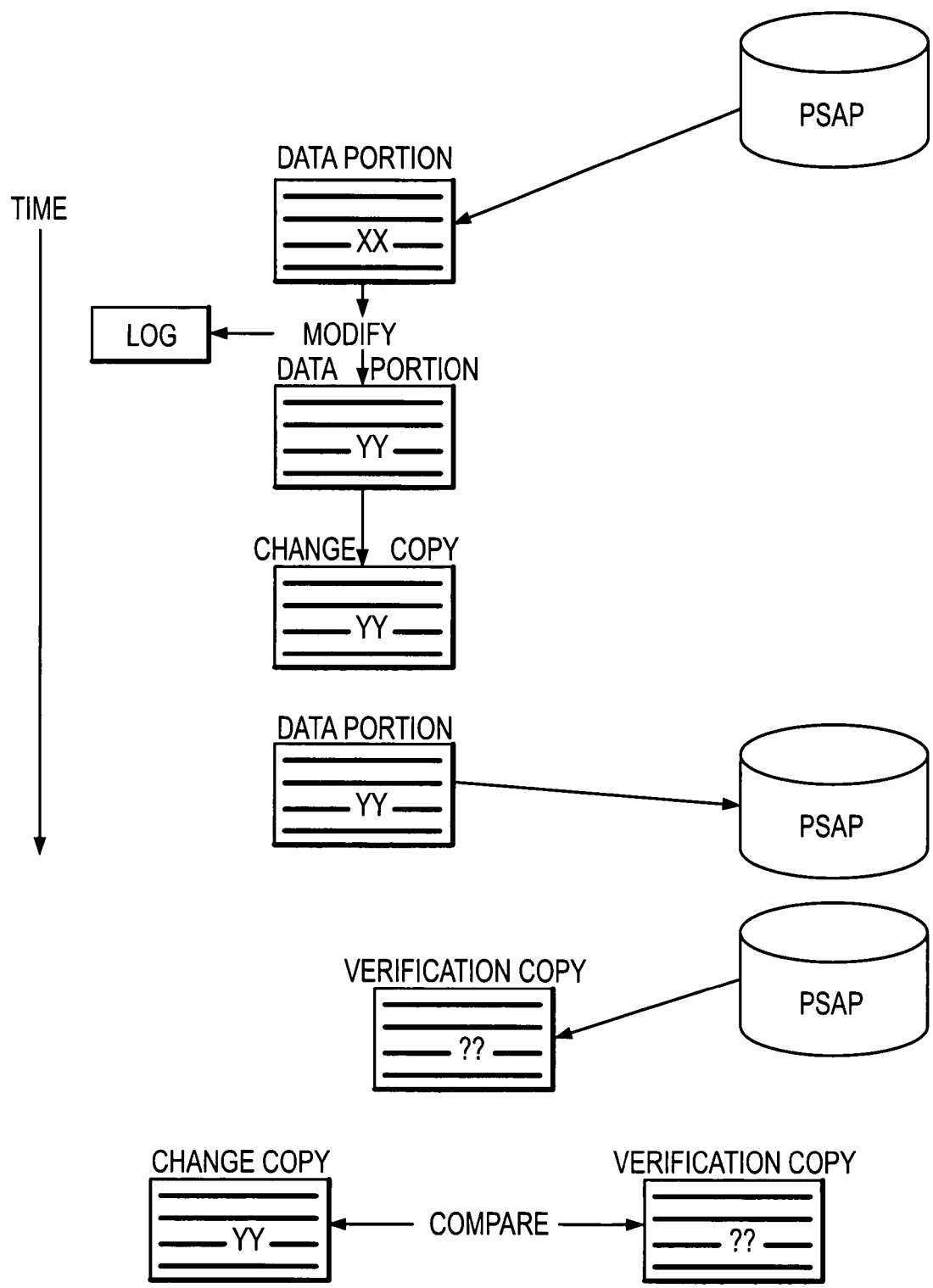
FIG. 5 is a timing diagram that shows data read, write, modify, and compare operations that are performed according to an embodiment of the invention.

FIG. 5 is a timing diagram that shows data read, write, modify, and compare operations that are performed according to an embodiment of the invention. In this embodiment, the modified data fields are checked to ensure that data that was supposed to be changed has in fact been changed. This checking does not verify the unmodified data fields, as described above, but can be performed in addition to the verification of the unmodified data fields.

The first action is the read of the data portion 118 from the PSAP database, as previously discussed.

In the second action, the original data field XX is modified to now be YY, as previously discussed. The data portion 118 is now different from the original data stored in the PSAP database. In addition, the change to the data field is recorded in the change log. The data field now comprises a modified data field.

The third action is the saving of the data portion 118 as the change copy 117. The change copy 117 includes all modified data fields.

The write action writes the modified data portion 118 to the PSAP database, as previously discussed.

The next action is the read of the verification copy 116 from the PSAP database, as previously discussed.

The comparison action compares the one or more modified data fields of the change copy 117 to the one or more modified data fields of the verification copy 116. The modified data fields of the change copy 117 and the verification copy 116 should be identical. If the comparison is not identical, then the PSAP administration system 100 can determine that the modified data fields were not properly written to the PSAP database. As a result, the PSAP administration system 100 can determine that an error occurred in the writing of the data portion to the PSAP database and can take appropriate action.

This comparison does not compare unmodified data fields and this comparison does not verify that unmodified data fields remain unchanged. The comparison only determines whether the modified data fields were changed in the PSAP database.

The invention claimed is:

1. A Public Safety Access Point (PSAP) administration system for safely modifying data in a PSAP database, the system comprising:
    a Graphical User Interface (GUI) for enabling user interaction;
    a storage system; and
    a processing system in communication with the GUI, the storage system, and the communication interface, with the processing system being configured to:
        log changes to a data portion to be modified, with the logging defining one or more modified data fields and one or more unmodified data fields in the data portion;
        read out and store a safe copy of the data portion from the PSAP database;
        write the data portion to the PSAP database after reading the safe copy from the PSAP database;
        read out a verification copy of the data portion written to the PSAP database;
        compare the one or more unmodified data fields of the safe copy to the one or more unmodified data fields of the verification copy; and
        generate an alarm if the one or more unmodified data fields of the safe copy are not identical to the one or more unmodified data fields of the verification copy.

2. The system of claim 1, with the processing system being configured to read out and store the safe copy in response to an initiation of the write and before the write.

3. The system of claim 1, with the processing system being further configured to restore the one or more unmodified data fields of the safe copy to the PSAP database if the one or more unmodified data fields of the safe copy are not identical to the one or more unmodified data fields of the verification copy.

4. The system of claim 1, with the processing system being further configured to log data regions of the one or more unmodified data fields that are not identical between the one or more unmodified data fields of the safe copy and the one or more unmodified data fields of the verification copy.

5. The system of claim 1, further comprising:
    before the writing, storing the one or more modified data fields of the data portion in a change copy;
    comparing the one or more modified data fields of the verification copy to the one or more modified data fields of the change copy; and
    generating an alarm if the one or more modified data fields of the verification copy are not identical to the one or more modified data fields of the change copy.

6. The system of claim 1, with the PSAP administration system comprising at least a portion of a Mobile Application Provisioning System (MAPS).

7. The system of claim 1, with the processing system being further configured to generate a display of the unmodified data fields of the safe copy and a display of the unmodified data fields of the verification copy.

8. A method for safely modifying data in a Public Safety Access Point (PSAP) database, the method comprising:
    logging changes to a data portion to be modified, with the logging defining one or more modified data fields and one or more unmodified data fields in the data portion;
    reading out and storing a safe copy of the data portion from the PSAP database;
    writing the data portion to the PSAP database after reading the safe copy from the PSAP database;

reading out a verification copy of the data portion written to the PSAP database;

comparing the one or more unmodified data fields of the safe copy to the one or more unmodified data fields of the verification copy; and generating an alarm if the one or more unmodified data fields of the safe copy are not identical to the one or more unmodified data fields of the verification copy.

9. The method of claim 8, with the reading out and storing of the safe copy being performed in response to an initiation of the writing and before the writing.

10. The method of claim 8, further comprising restoring the one or more unmodified data fields of the safe copy to the PSAP database if the one or more unmodified data fields of the safe copy are not identical to the one or more unmodified data fields of the verification copy.

11. The method of claim 8, further comprising logging data regions of the one or more unmodified data fields that are not identical between the one or more unmodified data fields of the safe copy and the one or more unmodified data fields of the verification copy.

12. The method of claim 8, further comprising:

before the writing, storing the one or more modified data fields of the data portion in a change copy;

comparing the one or more modified data fields of the verification copy to the one or more modified data fields of the change copy; and generating an alarm if the one or more modified data fields of the verification copy are not identical to the one or more modified data fields of the change copy.

13. The method of claim 8, further comprising generating a display of the unmodified data fields of the safe copy and a display of the unmodified data fields of the verification copy.

14. A method for safely modifying data in a Public Safety Access Point (PSAP) database, the method comprising:

logging changes to a data portion to be modified, with the logging defining one or more modified data fields and one or more unmodified data fields in the data portion;

reading out and storing a safe copy of the data portion from the PSAP database; writing the data portion to the PSAP database after reading the safe copy from the PSAP database;

reading out a verification copy of the data portion written to the PSAP database;

comparing the one or more unmodified data fields of the safe copy to the one or more unmodified data fields of the verification copy; and restoring the one or more unmodified data fields of the safe copy to the PSAP database if the one or more unmodified data fields of the safe copy are not identical to the one or more unmodified data fields of the verification copy, and generate an alarm if the one or more unmodified data fields of the safe copy are not identical to the one or more unmodified data fields of the verification copy.

15. The method of claim 14, with the reading out and storing of the safe copy being performed in response to an initiation of the writing and before the writing.

16. The method of claim 14, further comprising generating an alarm if the one or more unmodified data fields of the safe copy are not identical to the one or more unmodified data fields of the verification copy.

17. The method of claim 14, further comprising logging data regions of the one or more unmodified data fields that are not identical between the one or more unmodified data fields of the safe copy and the one or more unmodified data fields of the verification copy.

18. The method of claim 14, further comprising:

before the writing, storing the one or more modified data fields of the data portion in a change copy;

comparing the one or more modified data fields of the verification copy to the one or more modified data fields of the change copy; and generating an alarm if the one or more modified data fields of the verification copy are not identical to the one or more modified data fields of the change copy.

19. The method of claim 14, further comprising generating a display of the unmodified data fields of the safe copy and a display of the unmodified data fields of the verification copy.

* * * * *